(12) United States Patent
Willinger

(10) Patent No.: US 11,731,758 B2
(45) Date of Patent: Aug. 22, 2023

(54) DEVICE FOR DIRECTLY CONTROLLING A BLADE BY MEANS OF AN ELECTROMECHANICAL ACTUATOR

(71) Applicant: Yann Raymond Albert Willinger, France (FR)

(72) Inventor: Yann Raymond Albert Willinger, France (FR)

(*) Notice: Subject to any disclaimer, the term of this patent is extended or adjusted under 35 U.S.C. 154(b) by 893 days.

(21) Appl. No.: 16/627,283

(22) PCT Filed: Jul. 12, 2018

(86) PCT No.: PCT/FR2018/000192
§ 371 (c)(1),
(2) Date: Dec. 28, 2019

(87) PCT Pub. No.: WO2019/012191
PCT Pub. Date: Jan. 17, 2019

(65) Prior Publication Data
US 2020/0130824 A1    Apr. 30, 2020

(51) Int. Cl.
*B64C 27/72* (2006.01)
*B64C 11/44* (2006.01)
*B64U 10/10* (2023.01)

(52) U.S. Cl.
CPC .............. *B64C 27/72* (2013.01); *B64C 11/44* (2013.01); *B64U 10/10* (2023.01)

(58) Field of Classification Search
CPC .................................. B64C 27/72; B64C 11/44
See application file for complete search history.

(56) References Cited

U.S. PATENT DOCUMENTS

| | | | |
|---|---|---|---|
| 4,648,345 A * | 3/1987 | Wham ................... | B63H 3/002 416/158 |
| 5,282,719 A * | 2/1994 | McCarty ................ | B64C 11/44 416/165 |
| 10,800,513 B2 * | 10/2020 | Romeu ................... | B64C 11/32 |
| 2014/0061369 A1 * | 3/2014 | Schank ................. | B64C 27/008 324/207.22 |

* cited by examiner

*Primary Examiner* — Richard G Davis

(57) ABSTRACT

The present invention relates to a device for directly controlling a blade which comprises a stator (1), at least one blade carrier (7) composed of at least one curved magnet (6), the blade carrier (7) being secured to at least one blade (3) and pivotally coupled to the rotor (8) for varying the alpha angle of said blades with the excitation of the stator (1). The stator (1) is a partially spherical stator, the stator core (1) being the intersection of the blade axis (22) and the rotor axis (20), said stator being radially close to the magnets (3) to control the rotation of the blades (3) around the blade axis (22). A magnetic ring (5) holds the blades (3) in a neutral position, the system can be compared to a cyclically controlled mechanical oscillator, the frequency, phase and amplitude of the oscillation being controlled by said stator. Device providing a compact, lightweight and robust solution for controlling the direction of an aircraft.

13 Claims, 5 Drawing Sheets

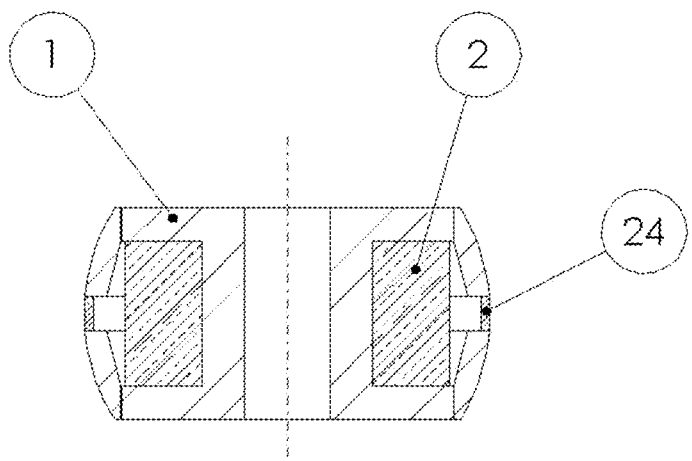
FIG. 7
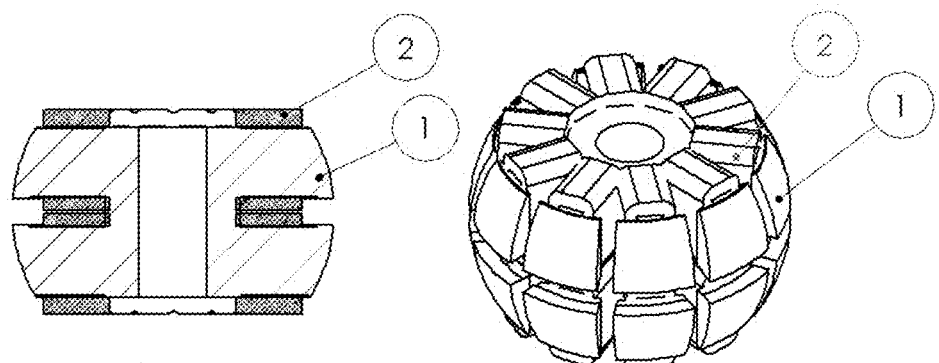
FIG. 8
FIG. 9
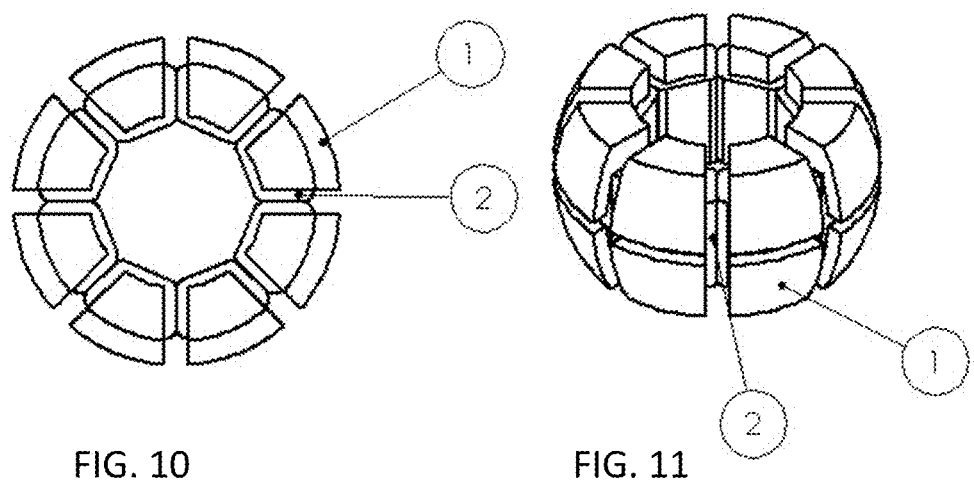
FIG. 10
FIG. 11

DEVICE FOR DIRECTLY CONTROLLING A BLADE BY MEANS OF AN ELECTROMECHANICAL ACTUATOR

The present invention relates to a direct blade control device and an aircraft provided with such system, and more particularly but not exclusively a small aerial vehicle main rotor, in particular a small unmanned vertical take-off and landing aerial vehicle.

The cyclic pitch and collective pitch control of the blades of a helicopter rotor is carried out in the prior art via a swashplate driven by actuators.

Links and mechanical parts assembly are actuated to have cyclic control of the blades to generate torque allowing orientation of the aircraft.

This system requires at least two actuators that orientate the non rotating part of the swashplate, the rotating part through the links commands the blade angle depending on their position with a sinusoidal function.

The complexity of these mechanical systems, their weights, limit their applications for some aircrafts, especially those of small size, mainly because of the at least two actuators for the swashplate.

Some systems directly control the blades by actuators coupled to the blades, power supply and control of these actuators in rotation with the rotor are problematic, they require either generators that are an additional weight or electrical brushes that are electrical contacts. Some systems directly control the blades by electromechanical systems, in particular cyclic pitch controls, by complex switching of a plurality of electromagnets. Some direct blade control systems provide one or more coils to control the cyclic pitch of the blades but the proposed systems are unstable or do not provide enough electromechanical interaction to provide direct blade control.

WO2005/100154A1 (WAVE FRONT TECHNOLOGY PTY LTD) provides individual control of the blades by stepper motor, the powering of the motors is performed by an alternator or multiple alternators arranged concentrically to the rotor.

US2015/0028597A1 (Sikorsky) provides individual control of the blades with a blade actuator, the power supply of which requires at least one electrical brush for powering and controlling the actuators.

EP2821344A1 (AIRBUS) provides individual control of the blades which interact with disks composed of a plurality of electrically independent electromagnets, which can act as a motor or generator, the switching of one disc relative to the other acts on the rotation of the blades allowing collective pitch controls or cyclic pitch controls.

WO02/096752A1 (Vogel HERIBERT) provides individual control of the blades with coils either rotating with the rotor and supplied with brushes, either coaxial with the rotor but not rotating and actuating the blade through links inside the rotor shaft.

FR2851932 (Jean Marie PIEDNOIR) provide a direct blade control system with two blades, allowing cyclic command with at least one coil.

One of the main challenges with direct blade control system with electromechanical system is to generate enough torque to command and control blade pitch, with enough amplitude, for a given inertia and aeraulic torque of the blade and blade carrier. Especially cyclic commands which require high frequency oscillation of tens to hundreds of hertz. The oscillation is a variation of the angle plus minus alpha of the pitch blade around a neutral pitch, it creates a torque related to the inertia and the oscillation frequency around the blade axis rotation. An aerodynamic pitch moment is also present for a given aerofoil and can change with the blade incidence. It is then necessary to have the moving electromechanical parts with a low inertia and a system that provides high torque to control this oscillation in frequency, amplitude and phase.

The measurement of the pitch blade is complex in such system and so is the control loop, especially the neutral pitch blade control loop. A system allowing a stable neutral blade pitch without electromechanical actuation is ideal and less energy consuming.

The present invention relates to a device for directly control a blade providing cyclic command and pitch command by means of a central electromechanical actuator, a partially spherical stator located at the coincidence of the system pivot, allowing a small and constant airgap, generating a high torque and allowing an efficient oscillation around a neutral pitch blade, combining simplicity, lightness and robustness.

The device for directly controlling a blade, particularly for an aircraft, this rotative device comprising:
 a rotor rotating around a rotor axis
 at least a blade carrier pivotally coupled to the rotor around a blade axis, a blade plane is defined by the said rotor axis and blade axis.
 at least one blade attached to the blade carrier.
 a stator Said stator is a partially spherical stator, it is composed of at least one coil, the stator centre being the intersection of the blade axis and the rotor axis. The blade carrier comprises at least one curved magnet, offset from the blade axis perpendicular with the blade plane, radially close to the stator to allow electromagnetic interaction to control the rotation of the blades around blade axis.

A rotor plane is defined perpendicular with the rotor axis and coincident with the blade axis.

In a preferred embodiment the magnets are radially close to the stator in the rotor plane.

The said magnet can be a ferromagnetic part magnetically saturated by at least one permanent magnet.

The said magnet can be a plurality of non-curved magnet but forming a curve once assembled.

The external face of said magnet is radially close, typically in the rotor plane, of a magnetic ring secured with the rotor to hold the blade in a neutral position. Acting as a spring, the device can be compared to a cyclically controlled mechanical oscillator, the frequency, phase and amplitude being controlled by said stator, the energy required to control this oscillation is very low around the natural oscillation of the device. The magnetic ring closes the magnetic flux, avoiding magnetic perturbation, problematic for magnetometers.

In cyclic command, the said stator controls this oscillation in frequency, phase and amplitude. The frequency control is synchronized with the rotor rotational speed, the phase controls the torque direction, the amplitude controls the torque intensity.

The magnetic ring can be ferromagnetic, it can be composed of permanent magnets, said rotor magnet, holding the blade in a neutral pitch. The holding can be linear or not, depending on the magnetic ring shape, it provides a contactless, fatigueless holding system and reduces the inertia of said blade carrier around said blade axis. This neutral holding provides the device stability and improve the efficiency in cyclic command, it also allows open loop control. The blade with the carrier blade has a proper frequency oscillation depending on their inertia and on the torque generated by the magnetic ring attraction.

The said stator has a ferromagnetic core, laminated or not, it controls the blade rotation depending on the stator excitation. The centre of the stator being the intersection of the blade axis and the rotor axis, this allows the magnet to rotate about the rotor axis but also about the blade axis, thus the magnet will have a spherical coordinate of fixed radius with respect to the stator. The spherical stator and the curved magnet allow minimal airgap, typically 0.1 to 1 mm, between the magnet and the stator independently of the magnet position allowing strong and efficient magnetic interaction with great amplitude around the said blade axis. The said stator can be grooved to contain a coil, this simplify the winding and the stator manufacturing process. The stator may be composed of one or more coils coaxial with said rotor axis, in which case the stator is bipolar. The magnetic flux can also be controlled by several coils distributed around the periphery of the stator, the stator can then be multipolar, this allows a different magnetic distribution for each coil, it is then possible to have simultaneously cyclic pitch and collective pitch controls.

The magnets may be arranged in different ways, which may be a dipole whose poles are on the inner and outer face of a segment ring, or a bipolar ring, radially magnetized in the case of a single blade support.

In the case of a stator with a coaxial coil, which is therefore bipolar, if all the blades in pivot connection with the rotor have magnets of similar polarities, they will all have the same pitch, allowing collective pitch controls acting as a variable pitch propeller. If the blades have magnets of opposite polarities, they will have a variation in the opposite incidence depending on the stator excitation, thereby generating, depending on their positions about the said rotor axis, cyclic pitch commands. In the case of a single blade, the cyclic pitch is controlled but also the collective pitch, which in this case combines both operations.

The device drastically reduces the number of parts required for blade pitch control, which is kinematically simple, the pivot connection between the blades and the main rotor can be provided by rolling bearings, there is therefore no friction, no link, no swashplate.

The excitation of the stator will cause the rotation alpha of the blades in either direction along the direction of the current, the intensity of the current will vary the amplitude of the rotation alpha. This device allows simple and very rapid control of the blades, in a sinusoidal manner, but also all other complex functions allowing different controls regarding the prior art.

The oscillation around a neutral position of the blades pitch allows simplified control of the blades pitch, in frequency, amplitude and phase, the only data of the angular velocity of the blades is sufficient for this loop control. A loop control using the measurement of the Electro-motive Force (EMF) enables the angular velocity of the blades to be controlled. It is possible to measure the EMF on the coil or coils allowing excitation of the stator, nevertheless one or more coils dedicated to the measurement allow more efficient control.

The stator can be composed of at least one coaxial measurement coil, enabling optimum measurement of the EMF in order to determine the angle of the blades. The stator may be composed of at least one measurement coil located on the spherical portion of the stator in order to determine by the Electromotive Force or by induction the position of the blades. The fact that the at least one measurement coil for measuring the position of the blades or the angle of the blades is located on the spherical part reduces the magnetic disturbances due to the stator excitation. Ideally these measurement coils are surface coils, enamelled wire or flexible printed circuit. The system can also operate in an open loop control.

In cyclic pitch control, a constant supply of the said stator will be able to cancel the phenomena of static pitch difference between two blades commonly known as tracking, for a single blade, it controls the collective pitch.

The pivot connection between the blades and the rotor and the "magnetic stiffness" of the blades rotation provided by the magnets allow with an appropriate aeraulic blade moment to have a reaction to the transverse air flow similar to a so called "K link" to reduce the incidence of the blade advancing with respect to the blade moving back into a transverse air flow, this characteristic assists in the stability of the device and its robustness in case of large transverse wind.

The device according to the invention allows cyclic pitch control, collective pitch control, the prototypes show high reactivity, low power consumption, simple operation, high compactness, mechanism lightening, and good reliability.

The system is ideally coupled directly to an engine, providing a compact, lightweight and robust solution for the orientation of an aerial vehicle, in particular for small unmanned aerial vehicle. The device can be used in aircraft, particularly vertical and take-off aircraft. When two devices are used for a fixed wing, in particular when they are arranged coaxially and counter-rotating, it is possible to control aircraft which comprise a fixed wing and thus be able to subtract the surface controls.

The attached drawings illustrate the invention:

Figure 1:
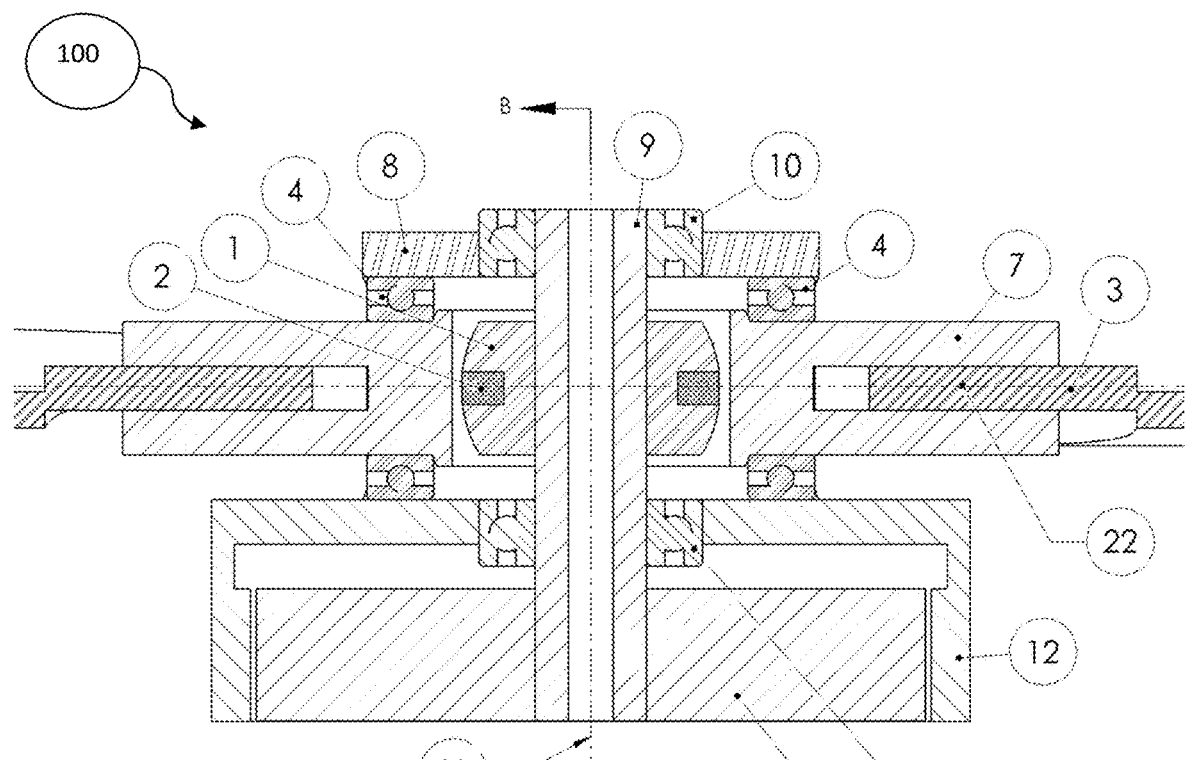
FIG. 1 shows in section, the device of the invention in the axis of the blades, a partially spherical stator with a coaxial coil, a single blade carrier with two magnets secured to two blades, with a neutral alpha angle and with the representation of a motor coupled to the device.
Figure 2:
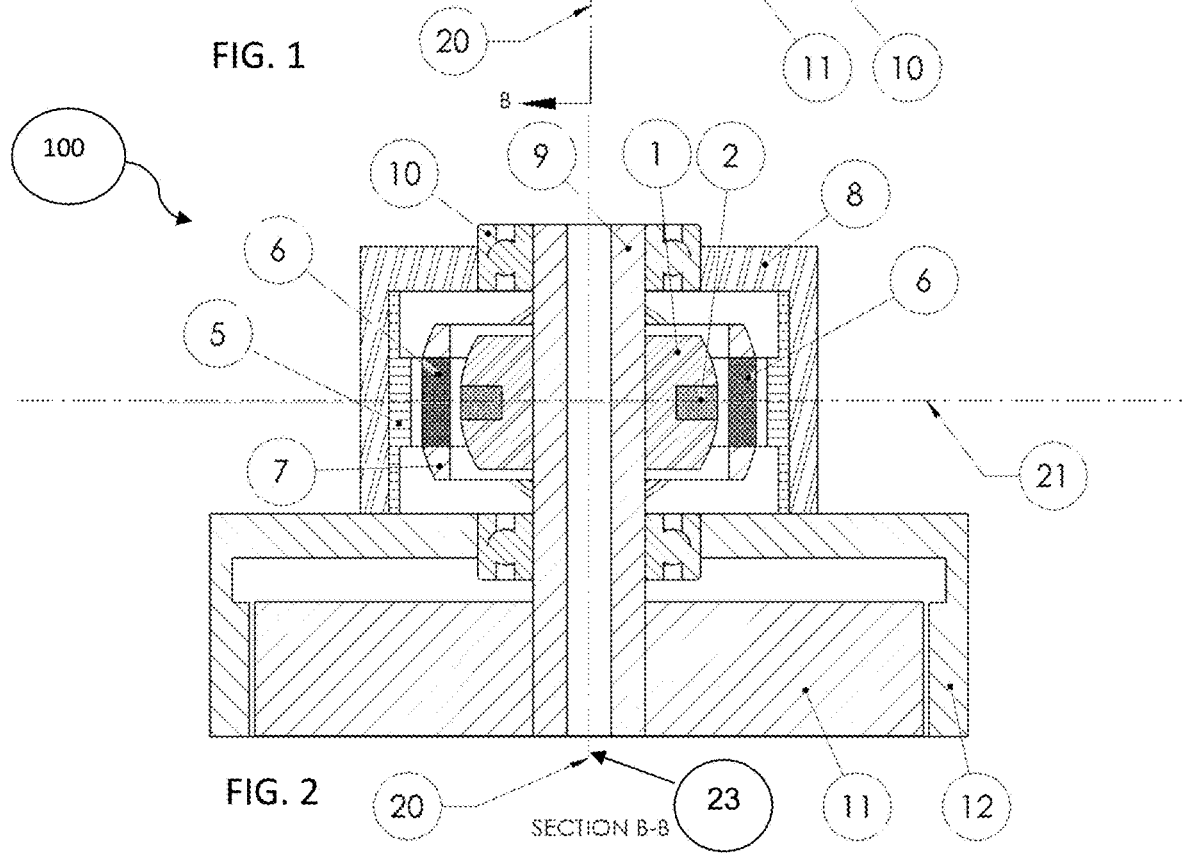
FIG. 2 shows in section BB, the device of the invention with a single blade carrier with two magnets secured to two blades.

The blade carrier (7) and the blades (3) are pivotally connected to the rotor (8) via the bearings (4), its angular rotation is limited by an angle + or − alpha which corresponds to the variation of the angle of a blade with respect to its neutral pitch. In the case of cyclic pitch control with two blades secured together (FIG. 1,2,3,4), when a blade increases from an angle alpha, the opposite blade is decreased by the same angle, thereby enabling cyclic pitch controls.

The stator (1) is ferromagnetic, of spherical shape, and is composed with a coil (2), depending on the direction of the current, the upper part will be in the north pole and the lower part in a south pole in one direction of the current and vice versa in the opposite direction.

Figure 3:
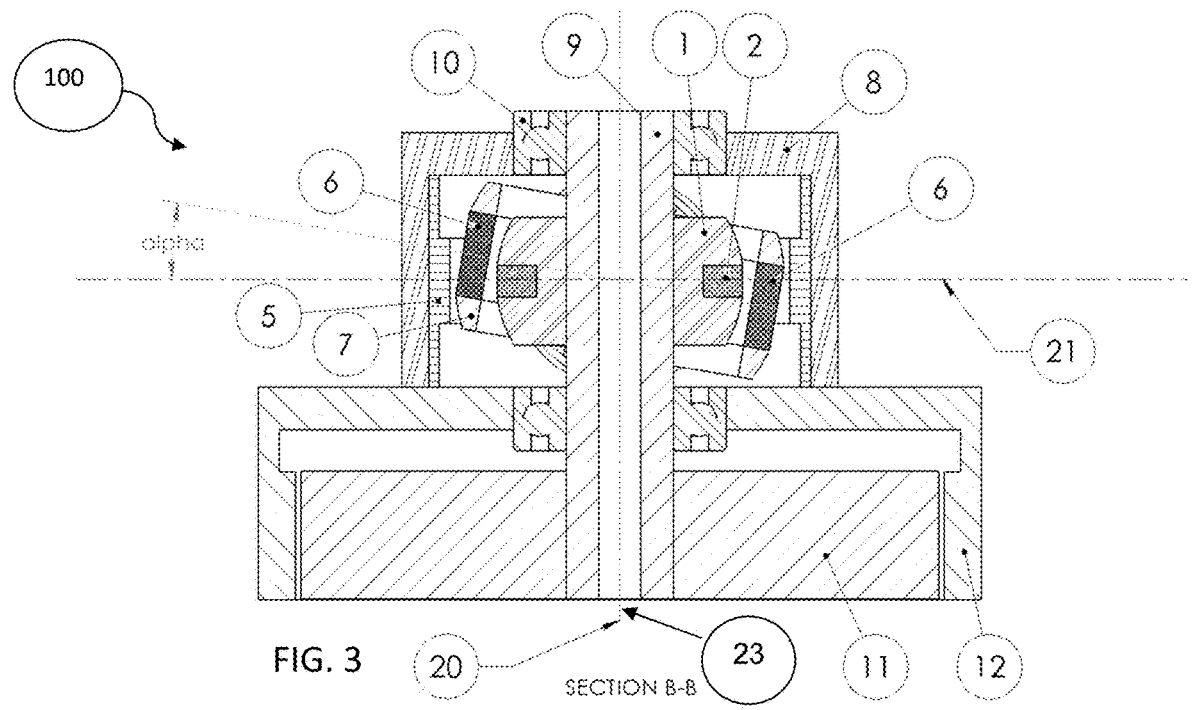
FIG. 3 shows in section BB, the device of the invention with an angle alpha.
Figure 4:
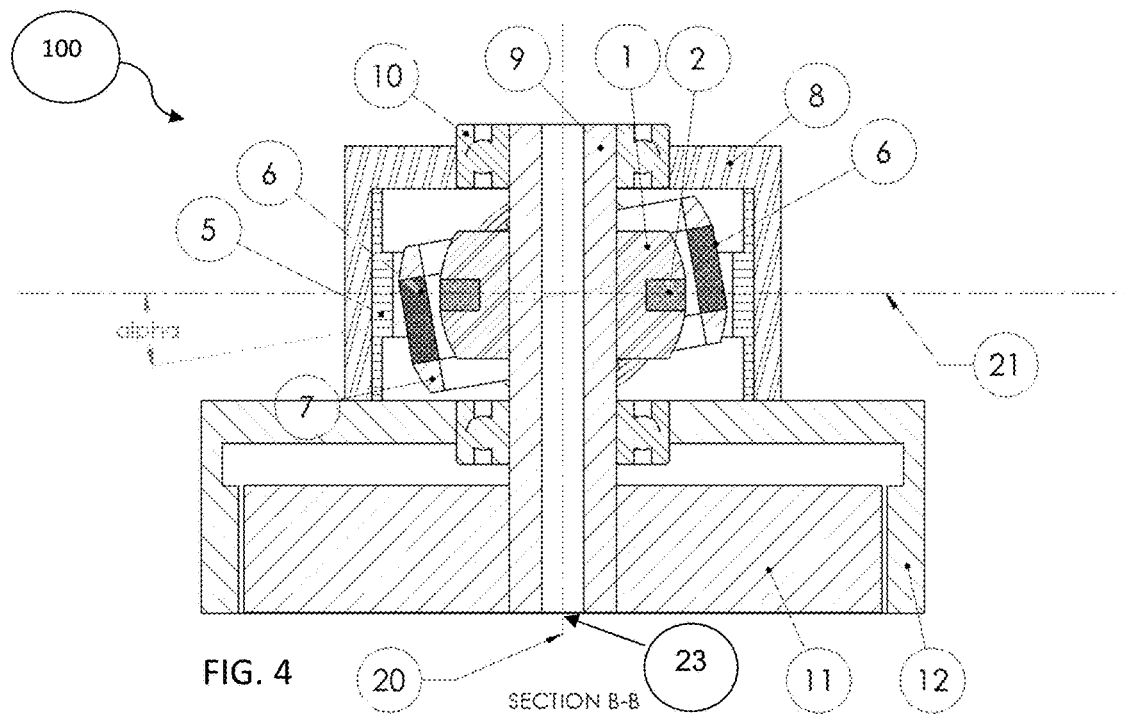
FIG. 4 shows in section BB, the device of the invention with an angle alpha opposite to FIG. 3.

According to FIGS. 1, 2, 3 and 4, the blade carrier (7) is composed of two magnets (6) of opposite poles, a north pole and a south pole, such that when the stator (1) is energized, one of the magnets is attracted by the upper portion of the stator (1) and the other magnet is attracted by the lower portion of said stator thereby causing the blade carrier (7) and blades (3) to rotate of an angle +− alpha (FIG. 3 and FIG. 4).

Figure 5:
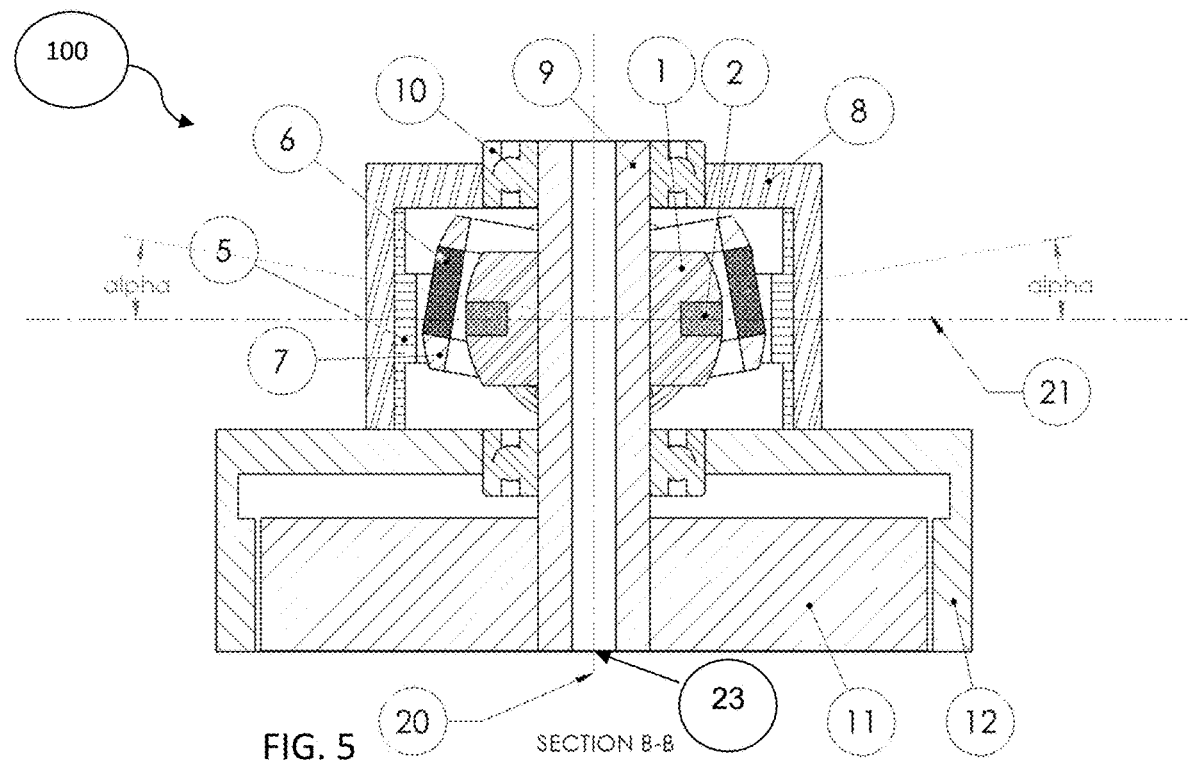
FIG. 5 shows in section BB a second embodiment, the device of the invention with two blade carrier, each with a magnet of the same polarity and with a blade, with a positive angle alpha for all the blades. On these drawings, the axis (9) is fixed, the bearings (10) allow the rotor (8) along with the at least one blade carrier (7) and the blades (3) to rotate about the axis (9).

In FIG. 5, the poles are similar, so that when the stator (1) is energized, all the magnets are attracted by the upper or lower part of said stator depending on the direction of the current thereby causing the blade carriers (7) and blades (3) to rotate of an angle alpha (FIG. 5) having the effect of collective pitch controls.

The magnetic ring (5) is ferromagnetic, allowing to loop the magnetic flux of the magnets (6) thus avoiding magnetic disturbances. The magnetic ring (5) also ensures the neutral position of the blade carrier (7), the magnets (6) being attracted by the magnetic ring (5), the shape of said magnetic ring provide a "magnetic stiffness" on the rotation of the blade carrier (7) acting as a spring.

Figure 6:
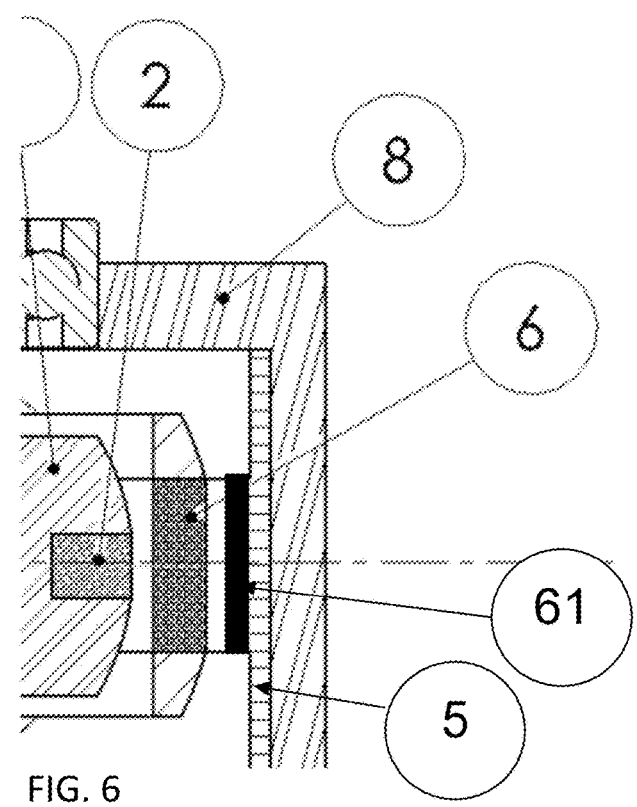

FIG. 6 shows the magnetic ring composed of rotor magnet (61) in order to generate a magnetic attraction on the magnets (6).

FIG. 7 shows a bipolar stator, optimized to generate a maximum torque, the measurement coil (24) allows to measure, by the Electro-motive Force, the angular velocity of the blades (3) about the blade axis.

FIGS. 8,9,10,11 show the stator with several coils distributed around the periphery of said stator (1), this allows to control several blades independently, and optionally to generate a motor torque about the axis (9) in interaction with the magnets (6) and with the rotor magnets (61).

Figure 12:
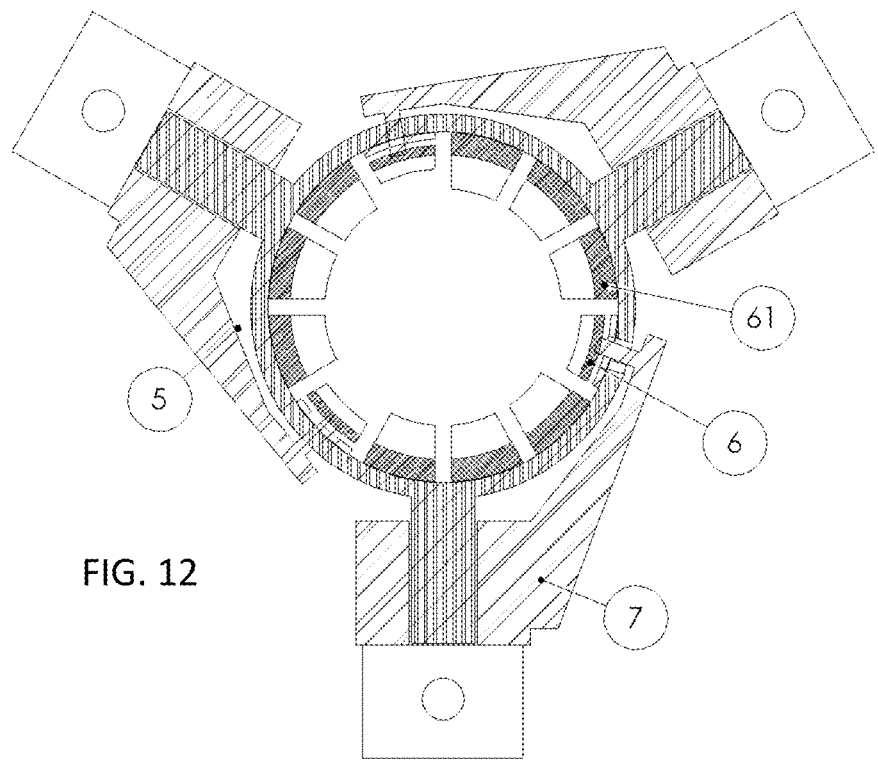
Figure 13:
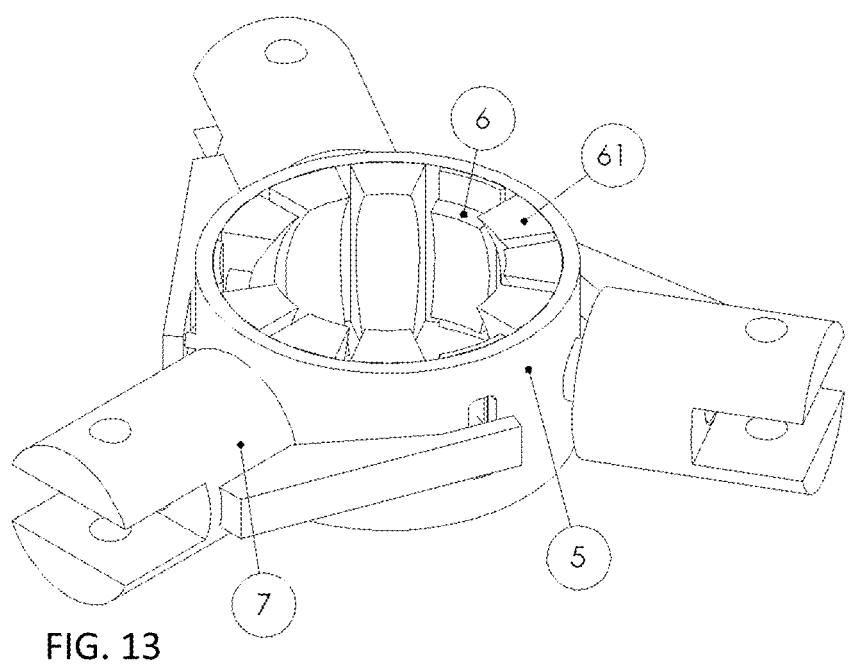

FIGS. 12, 13 show the device without the stator, with rotor magnets (61) allowing a motor torque about the axis (9), the magnets (6) enable the blade carrier (7) to be controlled.

The device according to the invention is ideally coupled to a motor, the rotor (8) coupled to the motor rotor (12) and the axis (9) coupled to the motor stator (11).

The device according to the invention is particularly intended for small vertical and take-off aircraft, helicopter type or fixed wing with vertical and take-off capabilities. The device may also be used for multi-rotor aircraft or helicopter tail rotors.

The invention claimed is:

1. A device (100) for directly controlling a blade, particularly for an aircraft, said device (100) comprising:
   a rotor (8) rotating around a rotor axis (20)
   at least one blade carrier (7) composed with at least one permanent magnet (6), said blade carrier (7) pivotally coupled with a rotor (8) around a blade axis (22),
a blade plane (23) is defined by said rotor axis (20) and said blade axis (22),
   at least one blade (3) attached to the blade carrier (7)
   a stator (1)
characterized in that said stator (1) is a partially spherical stator, it is composed of at least one coil (2), the centre of said stator (1) being the intersection of the blade axis (22) and the rotor axis (20), the internal face of said magnet (6) is curved, offset from the blade axis (22) perpendicular with the blade plane (23) radially close to the stator (1) to allow electromagnetic interaction to control the rotation of the blades (3) around the blade axis (22).

2. Device (100) according to claim 1 characterized in that the external face of said magnet (6) is radially close to a magnetic ring (5) secured with the rotor (8), to hold the blade (3) in a neutral position.

3. Device (100) according to claim 2 characterized in that said magnet ring (5) is composed of at least one rotor magnet (61).

4. Device (100) according to claim 1 characterized in that said magnet (6) is a ferromagnetic part magnetically saturated by at least one permanent magnet.

5. Device (100) according to claim 1 characterized in that the electromotive force (EMF) of the coils (2) for the stator excitation is measured in order to determine the position of the blades (3).

6. Device (100) according to claim 1 characterized in that the stator (1) has at least one measuring coil (24) coaxial with the rotor axis (20) for measuring the electromotive force to determine the angle of the blades (3).

7. Device (100) according to claim 1 characterized in that at least one measuring coil (24) is located on the spherical portion of the stator (1) in order to determine by the electromotive force or by induction the position of the blades (3).

8. Device (100) according to claim 7 characterized in that the measuring coils (24) are surface coils, enameled wire or flexible printed circuit.

9. Device (100) according to claim 1 characterized in that said stator (1) is composed of a plurality of coils (2) distributed on the periphery of said stator (1).

10. Device (100) according to claim 9 characterized in that the coils (2) of the stator (1) are switched so as to generate a torque around the rotor axis (20) in interaction with the magnets (6) and with the rotor magnets (61).

11. Device (100) according to claim 1 characterized in that a motor is directly coupled to the device.

12. A vertical and take-off aircraft having at least one device (100) according to any one of claims 1 to 11.

13. Aircraft according to claim 12, characterized in that it comprises a fixed wing.

* * * * *